US008489839B1

(12) United States Patent
Karandikar et al.

(10) Patent No.: US 8,489,839 B1
(45) Date of Patent: Jul. 16, 2013

(54) INCREASING MEMORY CAPACITY OF A FRAME BUFFER VIA A MEMORY SPLITTER CHIP

(75) Inventors: Ashish Karandikar, Sunnyvale, CA (US); Kaustubh Sanghani, Palo Alto, CA (US); Jonah M. Alben, San Jose, CA (US); Shane Keil, Santa Clara, CA (US)

(73) Assignee: Nvidia Corporation, Sanata Clara, CA (US)

( * ) Notice: Subject to any disclaimer, the term of this patent is extended or adjusted under 35 U.S.C. 154(b) by 741 days.

(21) Appl. No.: 12/639,728

(22) Filed: Dec. 16, 2009

(51) Int. Cl.
*G06F 13/16* (2006.01)

(52) U.S. Cl.
USPC .......................................... 711/167; 711/148

(58) Field of Classification Search
None
See application file for complete search history.

(56) References Cited

U.S. PATENT DOCUMENTS

| | | | | |
|---|---|---|---|---|
| 7,490,208 | B1 * | 2/2009 | Yue et al. | 711/167 |
| 7,571,296 | B2 * | 8/2009 | Reed | 711/167 |
| 2009/0276556 | A1 * | 11/2009 | Huang | 710/305 |

* cited by examiner

*Primary Examiner* — Gary Portka
(74) *Attorney, Agent, or Firm* — Patterson & Sheridan, L.L.P.

(57) ABSTRACT

The memory splitter chip couples multiple DRAM units to the PPU, thereby expanding the memory capacity available to the PPU for storing data and increasing the overall performance of the graphics processing system. The memory splitter chip includes logic for managing the transmission of data between the PPU and the DRAM units when the transmission frequencies and the burst lengths of the PPU interface and the DRAM interfaces differ. Specifically, the memory splitter chip implements an overlapping transmission mode, a pairing transmission mode or a combination of the two modes when the transmission frequencies or the burst lengths differ.

21 Claims, 8 Drawing Sheets

INCREASING MEMORY CAPACITY OF A FRAME BUFFER VIA A MEMORY SPLITTER CHIP

BACKGROUND OF THE INVENTION

1. Field of the Invention

The present invention generally relates to memory manage and, more specifically, to increasing the memory capacity of a frame buffer via a memory splitter chip.

2. Description of the Related Art

Conventional graphics processing systems usually include a graphics processing unit (GPU) coupled to a memory subsystem. The memory subsystem may include one or more memory caches and frame buffer logic coupled to external memory (such as a DRAM unit) via an external memory interface. The memory caches, the frame buffer and the external memory store data associated the computations performed by the GPU. The GPU is configured to efficiently process complex graphics and numerical computations.

The external memory interface typically includes a fixed number of pins that determine the amount of DRAM that can be coupled to the frame buffer. For example, a typical external memory interface comprises thirty-two pins; therefore, only one thirty-two pin DRAM unit or two sixteen pin DRAM units can be coupled to the frame buffer via the external memory interface. The pin layout of the external memory interface, thus, limits the amount of DRAM that can be connected to a graphics processing system. Such a constraint results in limited DRAM memory space available to the GPU for storing data, thereby affecting the overall performance of the graphics processing system.

To increase the DRAM memory space available to the GPU, the external memory interface could be modified to include more pins so that more DRAM units could be connected to the graphics processing system. One drawback to such an approach, though, is that adding pins to the external memory interface would make the circuitry of the external memory interface more complex, thus significantly increasing the manufacturing cost of the external memory interface. Another drawback to such an approach is the rigidity in the design of the external memory interface regardless of the DRAM memory space requirements of the system.

As the foregoing illustrates, what is needed in the art is a mechanism for increasing the DRAM memory space available to the GPU for storing data.

SUMMARY OF THE INVENTION

A system and method for managing the transmission of data between a parallel processing subsystem and a plurality of memory devices external to the parallel processing subsystem. The method includes the steps of receiving two or more commands from the parallel processing subsystem, wherein each command is associated with at least one external memory device included in the plurality of memory devices, determining a first transmission frequency associated with a first interface coupled to the processing subsystem based on a number of data cycles that can be transmitted over the first interface in a given amount of time, determining a second transmission frequency associated with a set of memory device interfaces coupled to the plurality of memory devices based on a number of data cycles that can be transmitted over each memory device interface in the given amount of time, wherein each memory device interface in the set of memory device interfaces is coupled to a different one of the plurality of memory devices, and transmitting data associated with the two or more commands between the processing subsystem and the plurality of memory devices based on the first transmission frequency and the second transmission frequency.

One advantage of the disclosed technique is that multiple DRAM units are coupled to a parallel processing unit via the memory splitter chip, thereby expanding the memory capacity available to the PPU for storing data and increasing the overall performance of the graphics processing system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
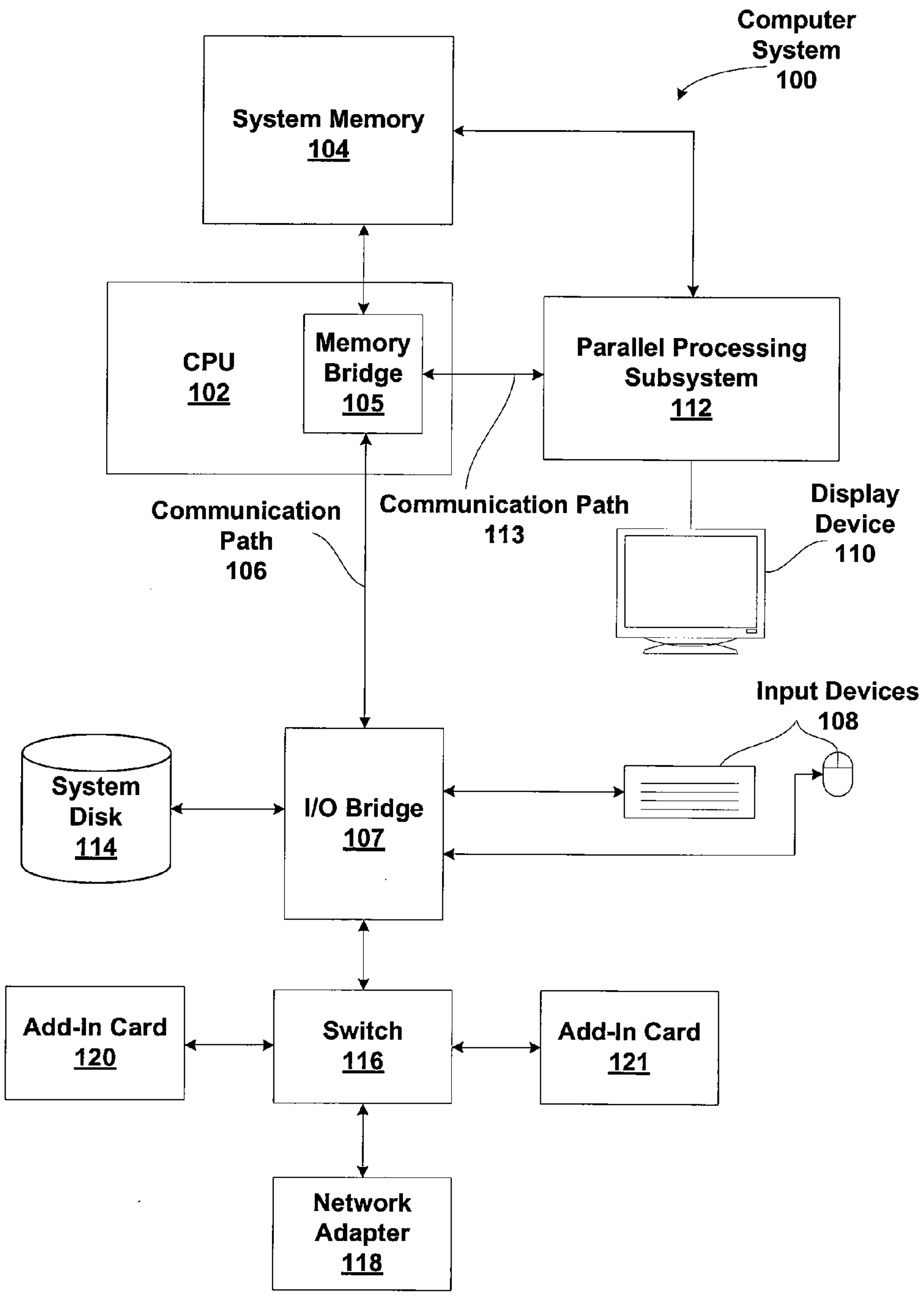
FIG. 1 is a diagram of a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
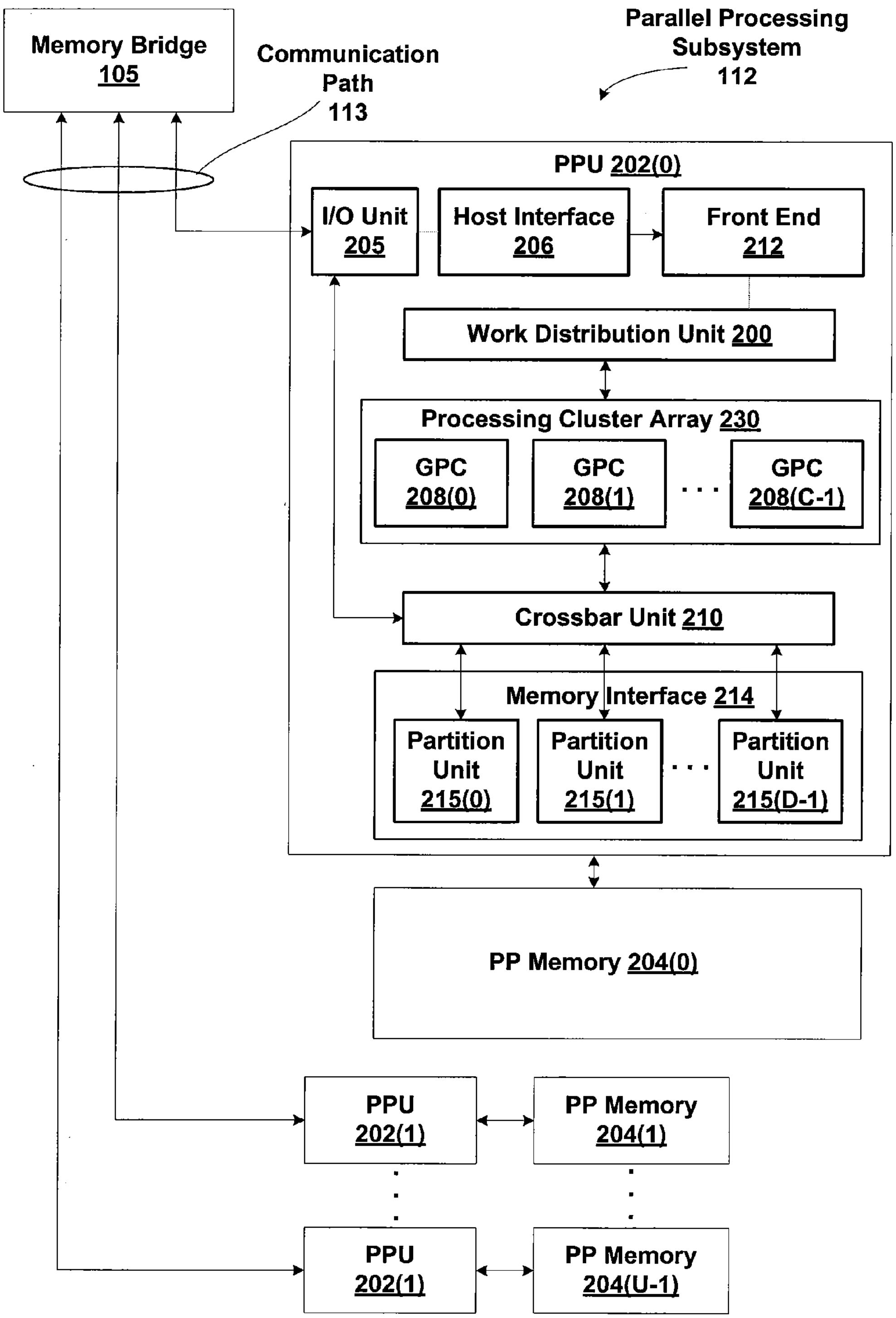
FIG. 2 is a diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where $D \geqq 1$. Each portion of parallel processing memory 204 generally includes one or more memory devices. Render targets, such as frame buffers or texture maps may be stored across the parallel processing memory 204, allowing partition units 215 to write portions of each render target in parallel to efficiently use the available bandwidth of parallel processing memory 204.

Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
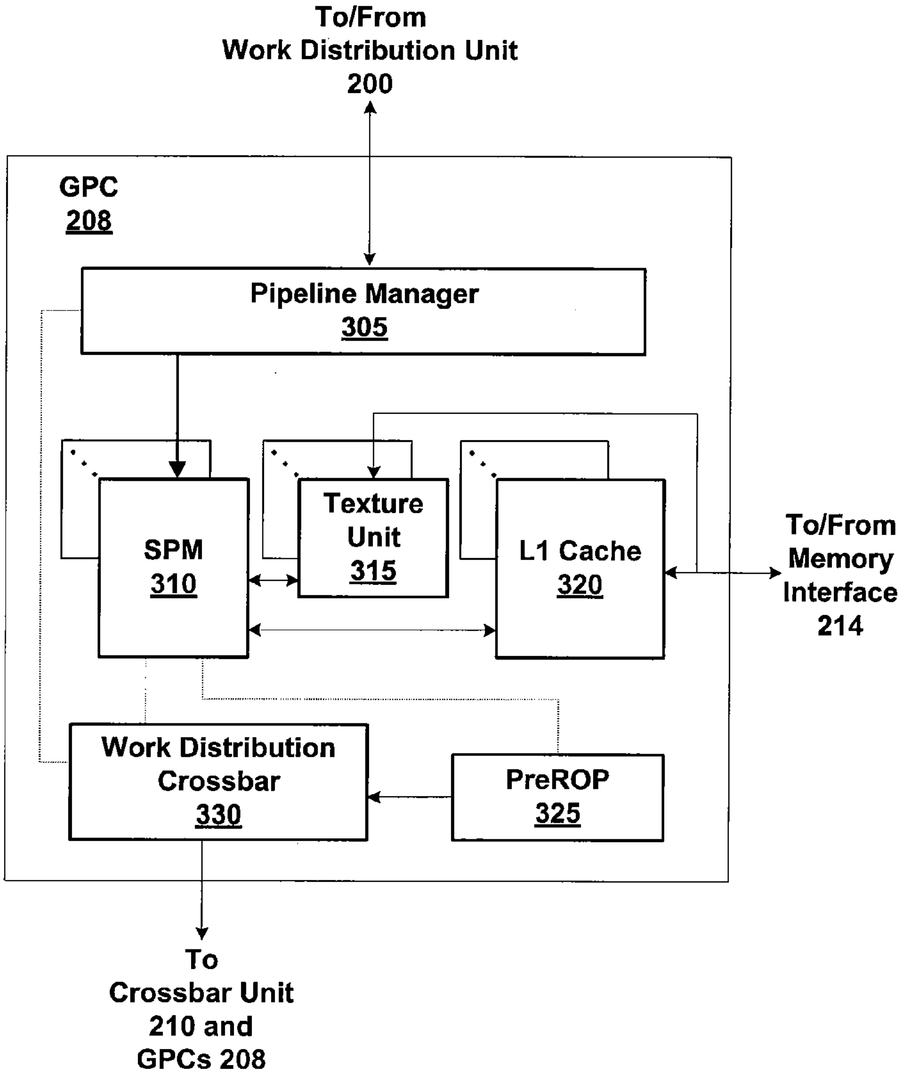
FIG. 3A is a diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

An exclusive local address space is available to each thread, and a shared per-CTA address space is used to pass data between threads within a CTA. Data stored in the per-thread local address space and per-CIA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
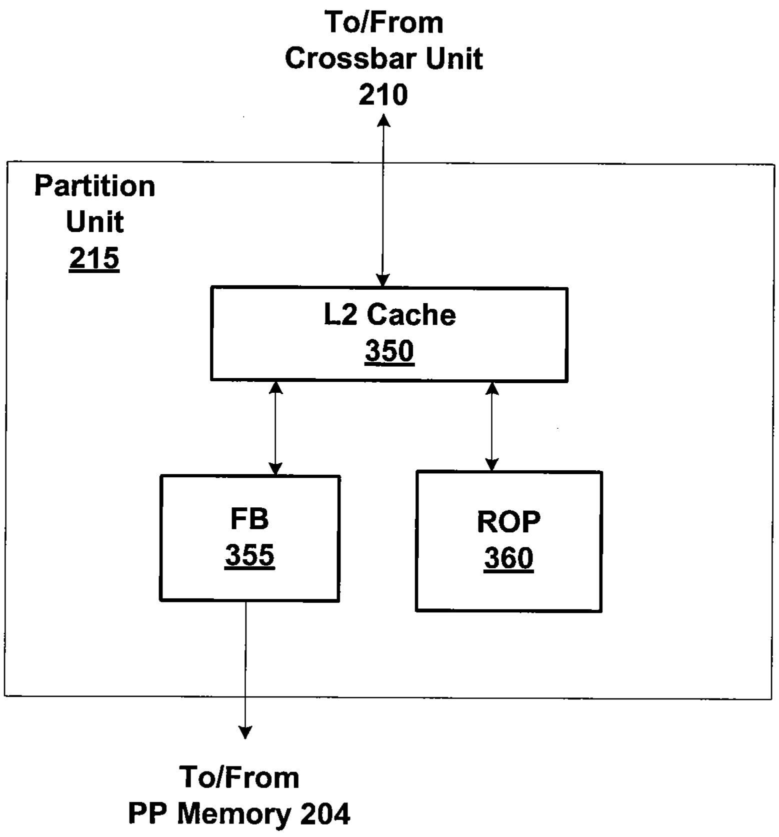
FIG. 3B is a diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with the PPU memory 204, outputting read and write requests and receiving data read from PPU memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Memory Splitter Chip

Figure 4:
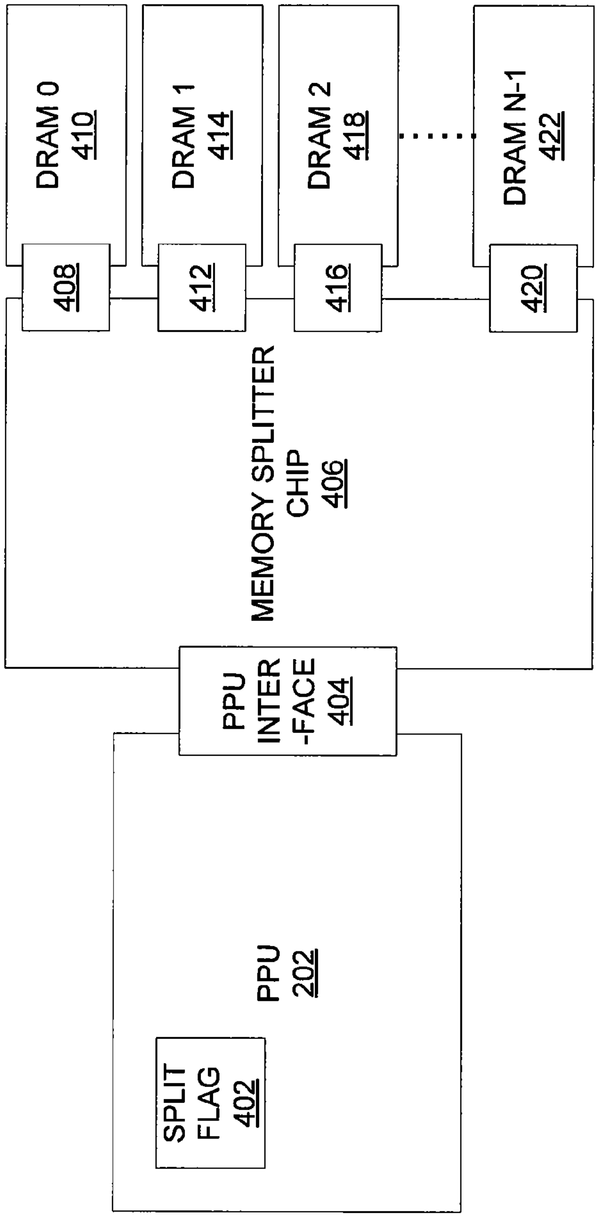
FIG. 4 is a diagram of the PPU of FIG. 2 coupled to multiple DRAMs via a memory splitter chip, according to one embodiment of the present invention.

FIG. 4 is a diagram of the PPU 202 of FIG. 2 coupled to multiple DRAMs via a memory splitter chip 406, according to one embodiment of the present invention. As shown, the PPU 202 is coupled to the memory splitter chip 406 via a PPU interface 404. As also shown, the memory splitter chip 406 is coupled to DRAM 410 via DRAM interface 408, DRAM 414 via DRAM interface 412, DRAM 418 via DRAM interface 416 and DRAM 422 via DRAM interface 420. Each of the DRAM 410, DRAM 414, DRAM 418 and DRAM 422 is a device having a specific memory capacity and a pre-determined operating speed.

The PPU 202 includes a split flag 402 to indicate that the PPU 202 is operates in a memory split mode when the PPU 202 is coupled to a memory splitter chip 406. The PPU 202 transmits read and write commands to the memory splitter chip 406 via the PPU interface 404 for processing. Each read or write command is associated with a memory address within a specific DRAM that specifies where data associated with the command should be read or written. When transmitting a write command, the PPU 202 also transmits data associated with a write command to the memory splitter chip 406 via the PPU interface 404 for storage in the memory address included in the write command. The PPU interface 404 is associated with a transmission frequency and a burst length. The burst length indicates the amount of data that is transmitted in a specific data cycle.

Upon receiving a read or a write command including a specific memory address from the PPU 202, the memory splitter chip 406 first selects the DRAM that is associated with the specific memory address. If the command is a write command, then the memory splitter chip 406 transmits the data associated with the write command to the selected DRAM via the corresponding DRAM interface for storage at the specific memory address. For example, if the specific memory address included in the write command were associated with DRAM 410, then the memory splitter chip 406 would transmit the data associated with the write command to DRAM 410 via DRAM interface 408 for storage at the specific memory address. If, however, the command is a read command, then the memory splitter chip 406 retrieves data stored at the specific memory address within the selected DRAM via the corresponding DRAM interface and transmits the data to the PPU 202 via the PPU interface 404. For example, if the specific memory address included in the read command were associated with DRAM 414, then the memory splitter chip 406 would retrieve the data stored at the specific memory address in DRAM 414 via DRAM interface 412. The retrieved data would then be transmitted to the PPU 202 via the PPU interface 404.

In one embodiment, the conventional command transmission protocol between the PPU 202 and a DRAM unit, allows the PPU 202 to only address a limited number of memory addresses in the DRAM unit. In such an embodiment, when the PPU 202 is in a memory split mode, the PPU 202 overloads the command signal to include a portion of the memory address and transmits the remaining portion of the memory address in the address signal. For example, if the command transmission protocol allows the PPU 202 to only address 32 GB of memory addresses, then five bits in the command signal can be used to address approximately 256 GB of memory addresses.

Importantly, each of the PPU interface 404, DRAM interface 408, DRAM interface 412, DRAM interface 416 and DRAM interface 420 transmits data at a particular transmission frequency and a particular burst length. In some implementations, the PPU interface 404 and the different DRAM interfaces transmit data at the same frequency, and in other implementations the PPU interface 404 transmits data at a higher frequency than the different DRAM interfaces. These different implementations are described below in conjunction with FIGS. 5 and 6.

Figure 5:
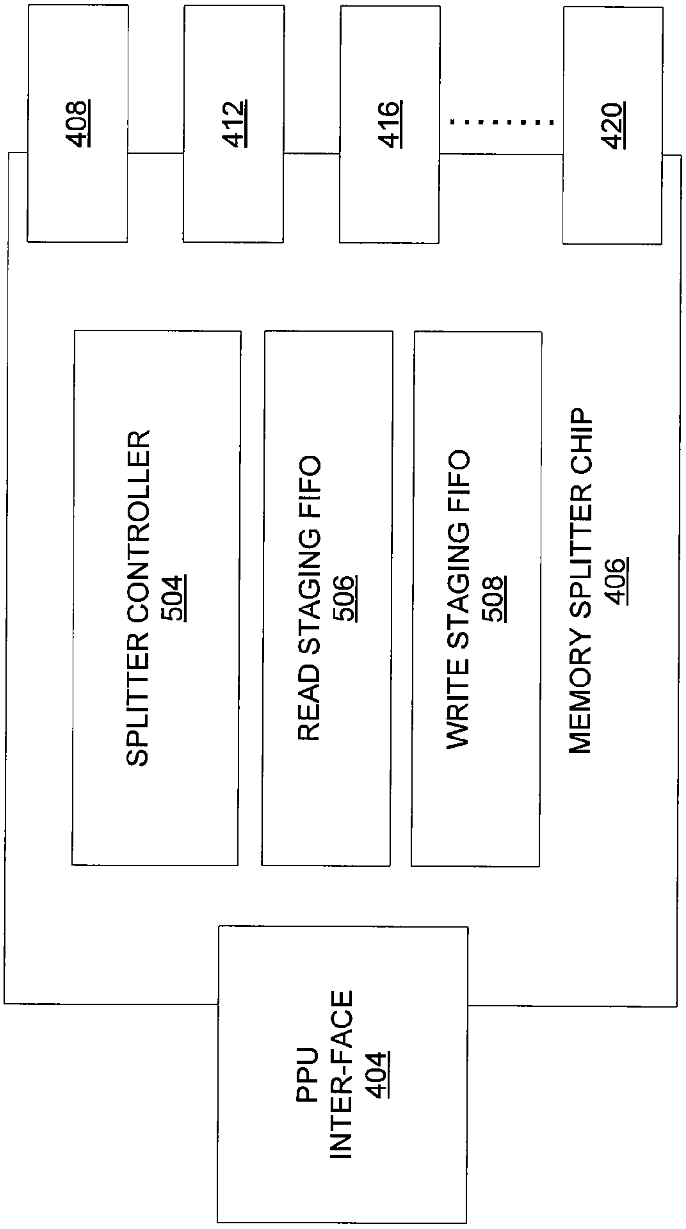
FIG. 5 is a more detailed diagram of the memory splitter chip of FIG. 4, according to one embodiment of the present invention.

FIG. 5 is a more detailed diagram of the memory splitter chip 406 of FIG. 4, according to one embodiment of the present invention. As shown, the memory splitter chip 406 includes a splitter controller 504, a read staging FIFO 506 and a write staging FIFO 508.

The splitter controller 504 processes read and write commands received from the PPU 202 and manages the transmission of data between the PPU 202 and the different DRAM units. Upon receiving a command from the PPU 202 (via the PPU interface 404), the splitter controller 504 first selects the DRAM associated with the command based on the memory address included in the command. In one embodiment, the splitter controller 504 may receive portions of the memory address from the PPU 202 in different cycles and combine those portions to form the memory address associated with the command.

If the transmission frequencies of the PPU interface 404 and the DRAM interfaces 408, 412, 416 and 420 are the same, then in the case of a write command, the splitter controller 504 directly transmits the data associated with the write command to the selected DRAM. In the case of a read command, the splitter controller 504 retrieves data stored at the memory address associated with the read command from the selected DRAM. The splitter controller 504 then directly transmits the retrieved data to the PPU 202 via the PPU interface 404. Further commands received from the PPU 202 are processed serially in the same fashion.

If, however, the transmission frequency of the PPU interface 404 is higher than the transmission frequency of the DRAM interfaces 408, 412, 416 and 420, then two or more consecutive commands are processed by the splitter controller 504 simultaneously. The number of consecutive commands that need to be processed simultaneously depends on the difference in the transmission frequencies of the PPU interface 404 and the DRAM interfaces 408, 412, 416 and 420. To process two or more consecutive commands simultaneously, the splitter controller 504 implements an overlapping transmission mode, a pairing transmission mode or a combination of the two transmission modes when transmitting data associated with those commands to or from the different DRAMs. The transmission mode that is implemented by the splitter controller 504 is determined based on the transmission frequencies and the burst lengths of the PPU interface 404 and the DRAM interfaces 408, 412, 416 and 420. Again, for a particular interface, the transmission frequency indicates a number of data cycles transmitted in a specific time period and the burst length indicates the amount of data transmitted in a particular data cycle. For the purposes of example only, the following discussion describes implementing each of the overlapping transmission mode and the pairing transmission mode when the transmission frequency of the PPU interface 404 is twice the transmission frequency of each of the DRAM interfaces 408, 412, 416 and 420.

If the burst lengths of the PPU interface 404 and each of the DRAM interfaces 408, 412, 416 and 420 is equal, then the splitter controller 504 implements the overlapping transmission mode. To implement the overlapping transmission mode, the splitter controller 504 processes two consecutive commands simultaneously. The splitter controller 504 also maps each data cycle of the PPU interface 404 to a data cycle of one of the DRAM interfaces 408, 412, 416 and 420. Data associated with the consecutive commands is transmitted to/received from the different DRAMs associated with those commands concurrently. The PPU 202 ensures that consecutive commands are associated with different DRAMs.

If the two consecutive commands are read commands, the splitter controller 504 transmits the read commands to the two different DRAMs associated with the read commands. The splitter controller 504 receives data from each of the different DRAMs at the transmission frequency of the corresponding DRAM interfaces. The data associated with each read command is transmitted to the PPU 202 at the transmission frequency of the PPU interface 404 in two different data cycles. If the two consecutive commands are write commands, the splitter controller 504 transmits the write commands to the two different DRAMs associated with the write commands. Data associated with each of the two write commands is received from the PPU 202 via the PPU interface 404 in two separate data cycles. The data associated with the write commands is transmitted to the associated DRAMs at the transmission frequency of the corresponding DRAM interfaces for storage concurrently.

If the burst length of the PPU interface 404 is twice the transmission frequency of each of the DRAM interfaces 408, 412, 416 and 420, then the splitter controller 504 implements the pairing transmission mode. To implement the pairing transmission mode, the splitter controller 504 processes two consecutive commands simultaneously. The splitter controller 504 also maps each data cycle of the PPU interface 404 to either two data cycles of one of the DRAM interfaces 408, 412, 416 and 420 or one data cycle each of two of the DRAM interfaces 408, 412, 416 and 420.

If the two consecutive commands are read commands, then the splitter controller 504 transmits the read commands to the DRAM(s) associated with the read commands. When the data associated with the read commands is received from the DRAM(s), the data is transmitted to the PPU 202 in one data cycle over the PPU interface 404. If the two consecutive commands are write commands, then the splitter controller 504 transmits the write commands to the DRAM(s) associated with the write commands. When the data associated with the read commands is received from the PPU 202 in one data cycle over the PPU interface 404, the data is transmitted to the DRAM(s) in two different data cycle over the corresponding DRAM interfaces 408, 412, 416 and 420.

Table 1 shows the transmission modes implemented by the memory splitter chip 406 to transmit data between the PPU 202 and different types of DRAMs. The table also displays the different burst lengths and the speeds of the PPU interface 404 and the DRAM interfaces 408, 412, 416 and 420 for each type of DRAM. For example, for the GDDR4 DRAM type, then the memory splitter chip 406 implements the overlap mode when the burst length of the PPU interface 404 is equal to the burst lengths of the DRAM interfaces 408, 412, 416 and 420.

TABLE 1

| Type of DRAM | Mode | PPU INTERFACE BL | DRAM INTERFACE BL | Speed | Efficiency |
|---|---|---|---|---|---|
| GDDR5 | Same Speed | 8 | 8 | 1/1x | 100% |
| GDDR5 with internal Bank Grouping | Same Speed | 8 | 8 | 1.6/1x | 80% |
| GDDR5 | Overlap | 8 | 8 | 1.6/2x | 80% |
| GDDR4 | Overlap | 8 | 8 | 1.6/2x | 80% |
| GDDR3-DIMM | Pair | 8 | 4 | 2/2x | 100% |
| SDDR3 | Overlap | 8 | 8 | 1.6/4x | 40% |

TABLE 1-continued

| Type of DRAM | Mode | PPU INTERFACE BL | DRAM INTERFACE BL | Speed | Efficiency |
|---|---|---|---|---|---|
| SDDR3-DIMM | Pair | 8 | 4 | 1/4x | 25% |
| SDDR2-DIMM | Pair | 8 | 4 | 2/4x | 50% |

Figure 6A:
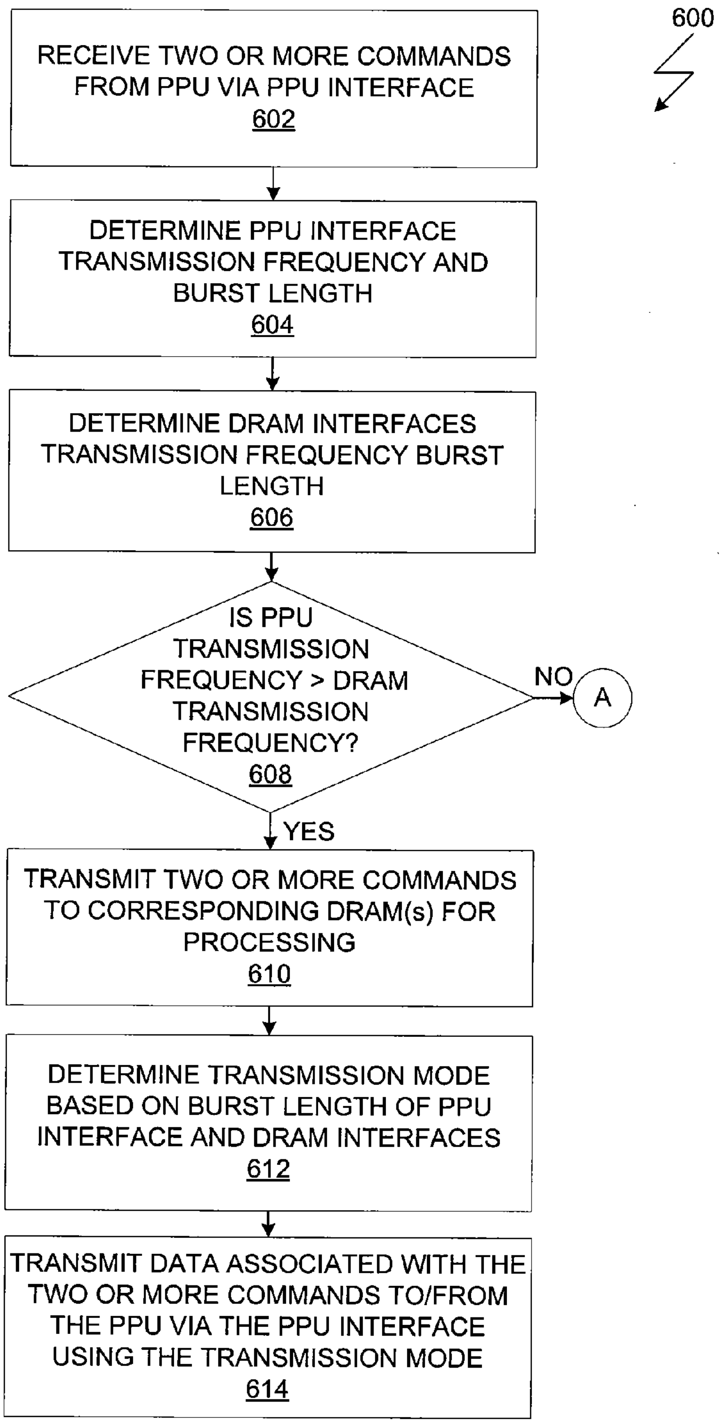
FIGS. 6A and 6B set forth a flow diagram of method steps for managing commands received from a PPU within the memory splitter chip, according to one embodiment of the present invention.
Figure 6B:
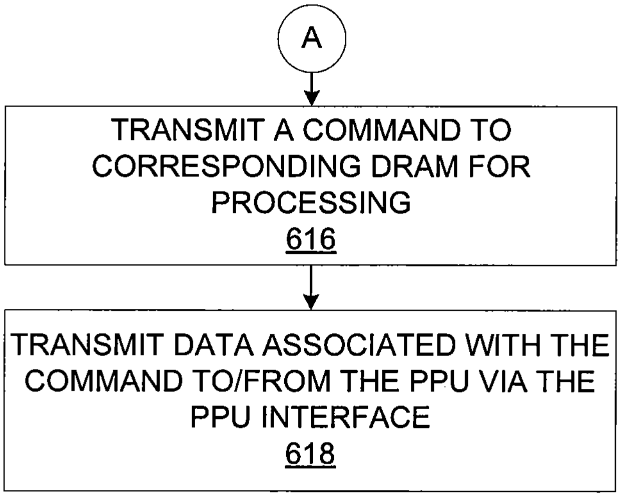

FIGS. 6A and 6B set forth a flow diagram of method steps for managing commands received from a PPU within the memory splitter chip, according to one embodiment of the present invention. Although the method steps are described in conjunction with the systems for FIGS. 1-5, persons skilled in the art will understand that any system configured to perform the method steps, in any order, is within the scope of the invention.

The method 600 begins at step 602 where the memory splitter chip 406 receives two or more commands from the PPU 202 via the PPU interface 404. At step 604, the splitter controller 504 determines the transmission frequency and the burst length associated with the PPU interface 404. At step 606, the splitter controller 504 determines the transmission frequency and the burst length associated with each of the DRAM interfaces 408, 412, 416 and 420. At step 608, the splitter controller 504 determines whether the transmission frequency associated with the PPU interface 404 is greater than the transmission frequency associated with the DRAM interfaces 408, 412, 416 and 420.

If so, then at step 610, the splitter controller 504 transmits two or more commands to corresponding DRAM(s) for processing. Again, the number of commands that are processed simultaneously is determined based on the difference in the transmission frequencies of the PPU interface 404 and the DRAM interfaces 408. At step 612, the splitter controller 504 determines the transmission mode of data associated with the two or more commands that are processed simultaneously based on the burst lengths of the PPU interface 404 and the DRAM interfaces 408, 412, 416 and 420. As previously described, if the burst lengths of the PPU interface 404 and the DRAM interfaces 408, 412, 416 and 420 are equal, then the overlapping transmission mode is used to transmit data between the PPU 202 and the different DRAMs. If, however, the burst lengths of the PPU interface 404 and the DRAM interfaces 408, 412, 416 and 420 are not equal, then the pairing transmission mode is used to transmit data between the PPU 202 and the different DRAMs. At step 614, the splitter controller 504 transmits the data associated with the processed two or more commands to/from the PPU 202 from/to the DRAM(s) associated with the two or more commands using the transmission mode.

If, at step 608, the transmission frequency associated with the PPU interface 404 is equal to the transmission frequency associated with the DRAM interfaces 408, 412, 416 and 420, then the method 600 proceeds to step 616. At step 616, the splitter controller 504 transmits a command to the corresponding DRAM for processing. At step 618, the splitter controller 504 transmits the data associated with the processed command to/from the PPU 202 from/to the corresponding DRAM.

One advantage of the disclosed technique is that multiple DRAM units are coupled to the PPU via the memory splitter chip, thereby expanding the memory capacity available to the PPU for storing data and increasing the overall performance of the graphics processing system. Another advantage of the disclosed technique is that the memory splitter chip couples directly to the PPU interface without any hardware modification to the PPU interface.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A computer-implemented method for managing the transmission of data between a parallel processing subsystem and a plurality of memory devices external to the parallel processing subsystem, the method comprising:

receiving two or more commands from the parallel processing subsystem, wherein each command is associated with at least one external memory device included in the plurality of memory devices;

determining a first transmission frequency based on a number of data cycles that can be transmitted over a first interface in a given amount of time, wherein the first interface is coupled to the parallel processing subsystem, and the first transmission frequency comprises a frequency at which the first interface transmits data;

determining a second transmission frequency based on a number of data cycles that can be transmitted over each memory device interface included in a set of memory device interfaces in the given amount of time, wherein each memory device interface in the set of memory device interfaces is coupled to a different one of the plurality of memory devices, and the second transmission frequency comprises a frequency at which each memory device interface transmits data; and transmitting data associated with the two or more commands between the parallel processing subsystem and the plurality of memory devices based on the first transmission frequency and the second transmission frequency.

2. The method of claim 1, wherein the step of transmitting the data associated with the two or more commands further comprises the steps of:

determining that the first transmission frequency is equal to the second transmission frequency;

processing each of the two or more commands serially; and mapping each data cycle associated with the first interface to a data cycle associated with at least one memory device interface in the set of memory device interfaces.

3. The method of claim 1, wherein the step of transmitting the data associated with the two or more commands further comprises the steps of:

determining that the first transmission frequency is greater than the second transmission frequency;

processing a first of the two or more commands and a second of the two or more commands simultaneously; and determining a transmission mode for transmitting the data associated with both the first command and the second command based on a first burst length associated with the first interface and a second burst length associated with the set of memory device interfaces, wherein the first burst length indicates a first amount of data transmitted over the first interface during a given data cycle and the second burst length indicates a second amount of data transmitted over a second memory device interface in the set of memory device interfaces during the given data cycle.

4. The method of claim 3, wherein the first command and the second command are consecutive commands.

5. The method of claim 3, wherein the transmission mode is an overlap mode when the first burst length is equal to the second burst length, further comprising the step of mapping each data cycle of the first interface to a data cycle associated with a different memory device interface in the set of memory device interfaces.

6. The method of claim 5, wherein the first command is associated with a first memory device, and the second command is associated with a second memory device.

7. The method of claim 3, wherein the transmission mode comprises a pair mode when the first burst length is greater than the second burst length, and further comprising the step of mapping each data cycle associated with the first interface to two or more concurrent data cycles, wherein each of the two or more concurrent data cycles is associated with a different memory device interface.

8. The method of claim 1, wherein a first command of the two or more commands is a read command, and data associated with the read command is transmitted from a memory device associated with the read command to the parallel processing subsystem.

9. The method of claim 1, wherein a first command of the two or more commands is a write command, and data associated with the write command is transmitted from the parallel processing subsystem to a memory device associated with the write command.

10. The method of claim 1, wherein a first of the two or more commands includes a first portion of a memory address associated with the first command.

11. The method of claim 10, further comprising the step of receiving an additional portion of the memory address after receiving the first command.

12. A memory splitter chip coupled to a parallel processing subsystem via a first interface and a plurality of memory devices external to the parallel processing subsystem via a set of memory device interfaces, the memory splitter chip comprising:

one or more data staging memory buffers; and a splitter controller configured to:

receive two or more commands from the parallel processing subsystem, wherein each command is associated with at least one external memory device included in the plurality of memory devices;

determine a first transmission frequency based on a number of data cycles that can be transmitted over a first interface in a given amount of time, wherein first interface is coupled to the parallel processing subsystem, and the first transmission frequency comprises a frequency at which the first interface transmits data;

determine a second transmission frequency based on a number of data cycles that can be transmitted over each memory device interface included in a set of memory device interfaces in the given amount of time, wherein each memory device interface in the set of memory device interfaces is coupled to a different one of the plurality of memory devices, and the second transmission frequency comprises a frequency at which each memory device interface transmits data; and transmit data associated with the two or more commands between the parallel processing subsystem and the plurality of memory devices based on the first transmission frequency and the second transmission frequency.

13. The memory splitter chip of claim 12, wherein the splitter controller is further configured to:

determine that the first transmission frequency is equal to the second transmission frequency;

process each of the two or more commands serially; and map each data cycle associated with the first interface to a data cycle associated with at least one memory device interface in the set of memory device interfaces.

14. The memory splitter chip of claim 12, wherein the splitter controller is further configured to:

determine that the first transmission frequency is greater than the second transmission frequency;

process a first of the two or more commands and a second of the two or more commands simultaneously; and determine a transmission mode for transmitting the data associated with both the first command and the second command based on a first burst length associated with the first interface and a second burst length associated with the set of memory device interfaces, wherein the first burst length indicates a first amount of data transmitted over the first interface during a given data cycle and the second burst length indicates a second amount of data transmitted over a second memory device interface in the set of memory device interfaces during the given data cycle.

15. The memory splitter chip of claim 14, wherein the first command and the second command are consecutive commands.

16. The memory splitter chip of claim 14, wherein the transmission mode is an overlap mode when the first burst length is equal to the second burst length, further comprising the step of mapping each data cycle of the first interface to a data cycle associated with a different memory device interface in the set of memory device interfaces.

17. The memory splitter chip of claim 16, wherein the first command is associated with a first memory device, and the second command is associated with a second memory device.

18. The memory splitter chip of claim 14, wherein the transmission mode comprises a pair mode when the first burst length is greater than the second burst length, and further comprising the step of mapping each data cycle associated with the first interface to two or more concurrent data cycles, wherein each of the two or more concurrent data cycles is associated with a different memory device interface.

19. The memory splitter chip of claim 12, wherein a first command of the two or more commands is a read command, and data associated with the read command is transmitted from a memory device associated with the read command to the parallel processing subsystem.

20. The memory splitter chip of claim 12, wherein a first command of the two or more commands is a write command, and data associated with the write command is transmitted from the parallel processing subsystem to a memory device associated with the write command.

21. A computing device, comprising:

a parallel processing unit;

a plurality of external memory devices; and a memory splitter chip configured to:

receive two or more commands from the parallel processing unit, wherein each command is associated with at least one external memory device included in the plurality of memory devices;

determine a first transmission frequency based on a number of data cycles that can be transmitted over a first interface in a given amount of time, wherein the first interface is coupled to the parallel processing unit, and the first transmission frequency comprises a frequency at which the first interface transmits data;

determine a second transmission frequency based on a number of data cycles that can be transmitted over each memory device interface included in a set of memory device interfaces in the given amount of time, wherein each memory device interface in the set of memory device interfaces is coupled to a different one of the plurality of memory devices, and the second transmission frequency comprises a frequency at which each memory device interface transmits data; and transmit data associated with the two or more commands between the parallel processing unit and the plurality of memory devices based on the first transmission frequency and the second transmission frequency.

* * * * *